United States Patent [19]

Sondergeld et al.

[11] Patent Number: 5,134,271
[45] Date of Patent: Jul. 28, 1992

[54] BAR CODE SYSTEM USED IN GEOPHYSICAL EXPLORATION

[75] Inventors: Carl H. Sondergeld, Broken Arrow; Chandra S. Rai, Tulsa, both of Okla.

[73] Assignee: Amoco Corporation, Chicago, Ill.

[21] Appl. No.: 665,211

[22] Filed: Mar. 6, 1991

Related U.S. Application Data

[63] Continuation of Ser. No. 264,917, Oct. 31, 1988, abandoned.

[51] Int. Cl.$^5$ .................. B21D 7/04; G06F 15/46; G06F 15/48; G01V 1/00
[52] U.S. Cl. ........................... 235/376; 73/153; 364/422
[58] Field of Search ............ 235/375, 376, 462; 364/420, 421, 422; 73/151, 152, 153

[56] References Cited

U.S. PATENT DOCUMENTS

| | | | |
|---|---|---|---|
| 2,458,093 | 1/1949 | Muskat et al. | 73/153 |
| 2,531,083 | 11/1950 | Smith | 73/19.01 |
| 2,613,250 | 10/1952 | Bilhartz et al. | 324/693 |
| 4,039,288 | 8/1977 | Moran | 141/130 |
| 4,196,845 | 4/1980 | Chesters | 235/462 |
| 4,227,404 | 10/1980 | West | 73/151 |
| 4,537,150 | 8/1985 | Bowers | 73/427 |
| 4,569,421 | 2/1986 | Sandstedt | 235/383 |
| 4,835,372 | 5/1989 | Gombrich et al. | 235/375 |
| 4,854,163 | 8/1989 | Mount, II et al. | 73/153 |
| 4,916,441 | 4/1990 | Gombrich | 235/380 |

OTHER PUBLICATIONS

IBM Technical Disclosure Bulletin, vol. 12, No. 9, Feb. 1970; J. C. Harris; "Identification System for Laboratory Use"; p. 1492.

*Primary Examiner*—Stuart S. Levy
*Assistant Examiner*—Edward H. Sikorski
*Attorney, Agent, or Firm*—Timothy D. Stanley

[57] ABSTRACT

The present invention relates generally to a method and system for geophysical exploration and more particularly to a method and system for obtaining selected physical properties of the subterranean formations surrounding a wellbore so as to aid the geophysicist in evaluating the oil and gas bearing potential of such formations. In one embodiment of the invention, core samples are obtained along the length of a wellbore and labeled with a machine readable bar code. A plurality of separately arranged measurement stations, each having a unique machine readable bar code, are provided for measuring properties of each sample. By use of a bar code a reader interconnected to a CPU, measurement of physical properties of the samples can be initiated at each measurement station. A log of each physical property as a function of depth can then be prepared with which explorationists can evaluate geophysical survey data for oil and gas potential.

9 Claims, 7 Drawing Sheets

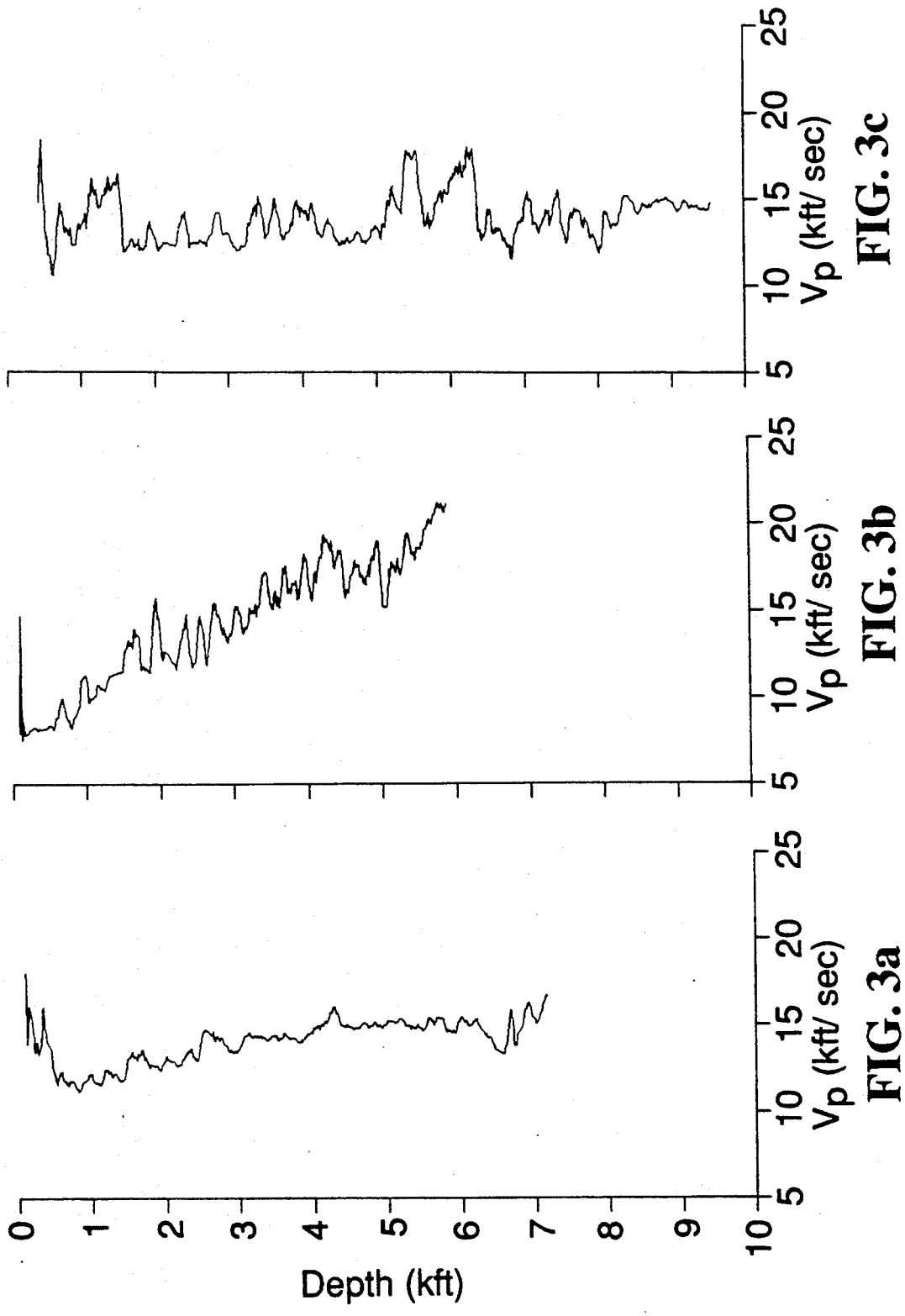

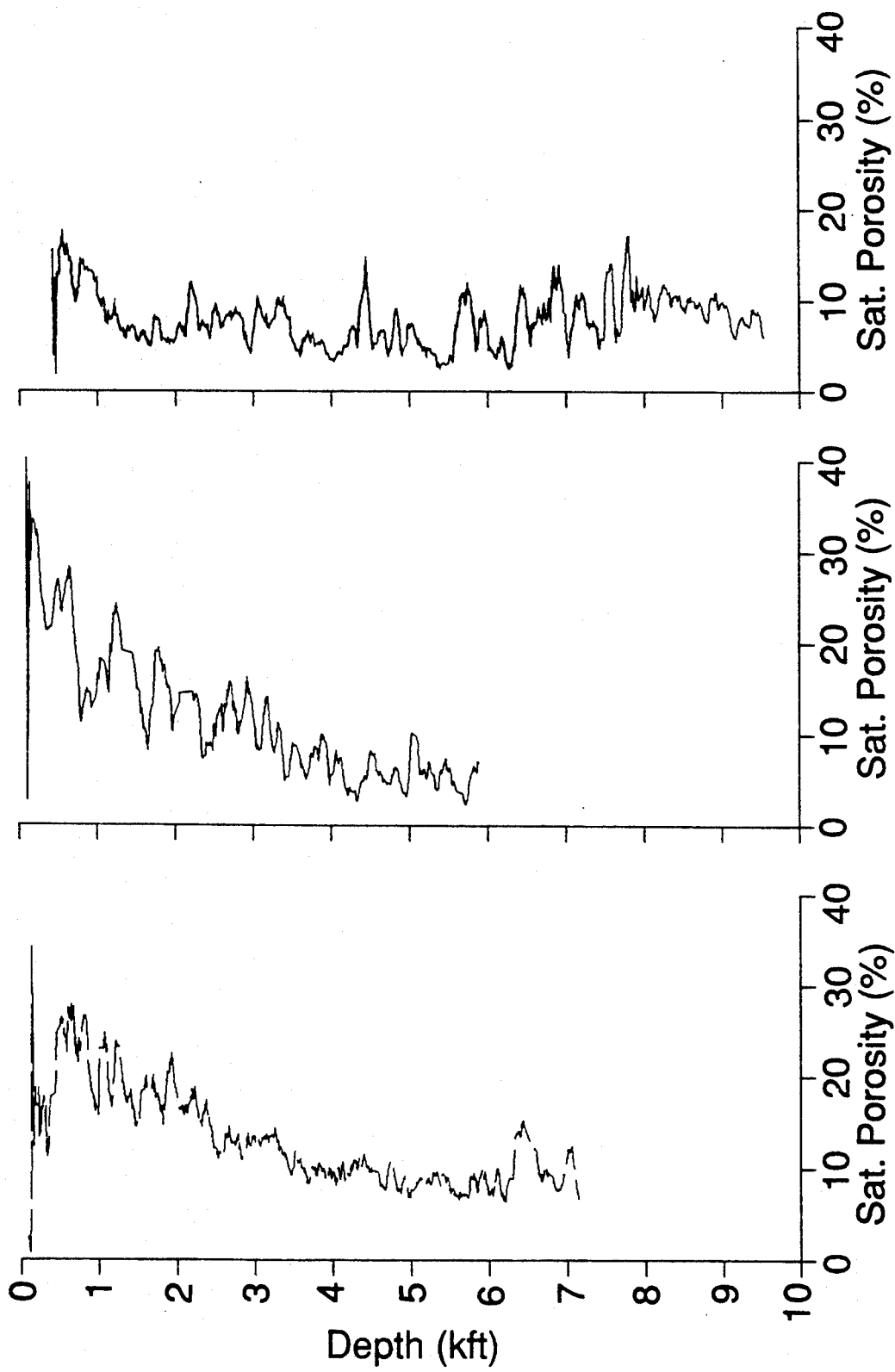

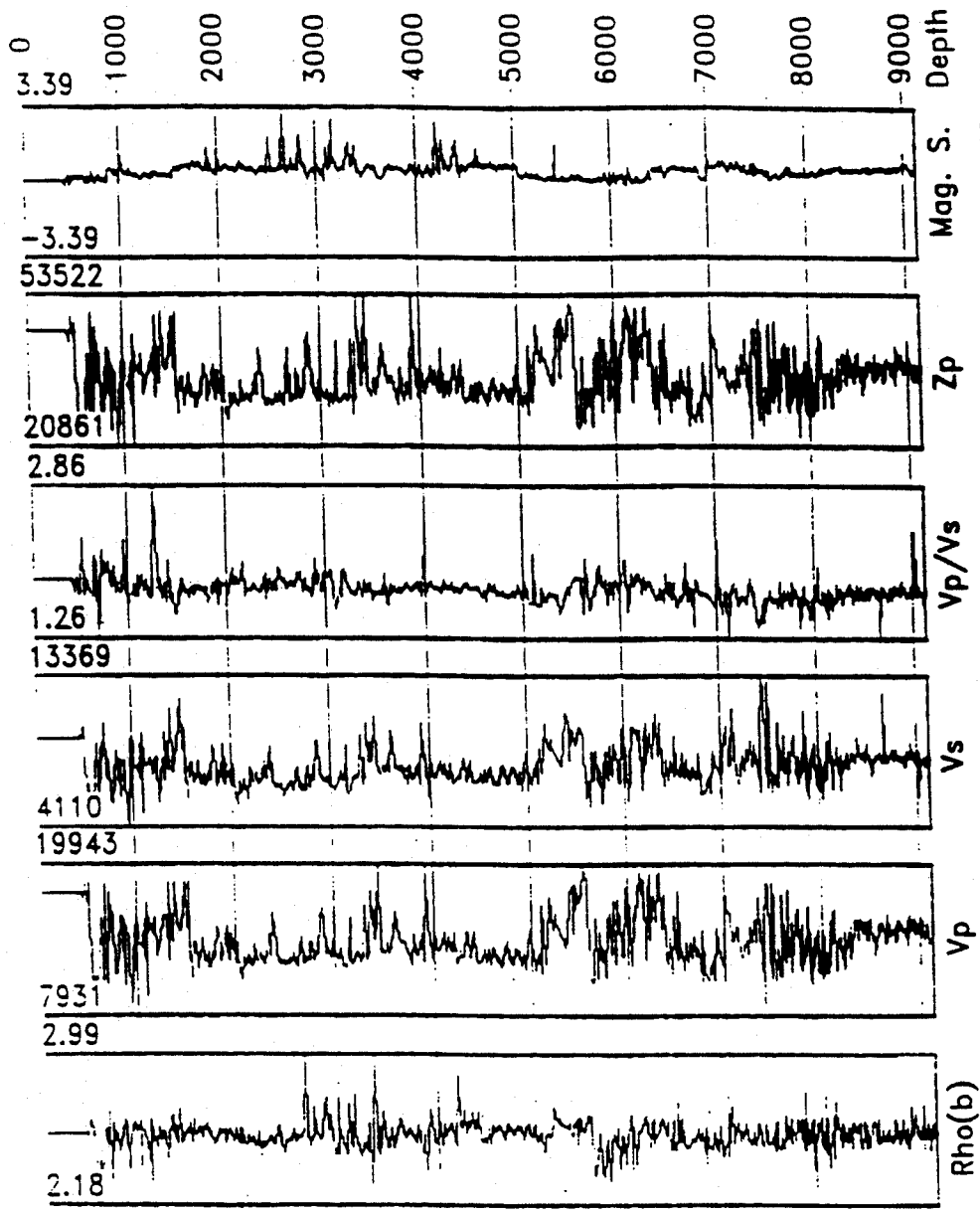

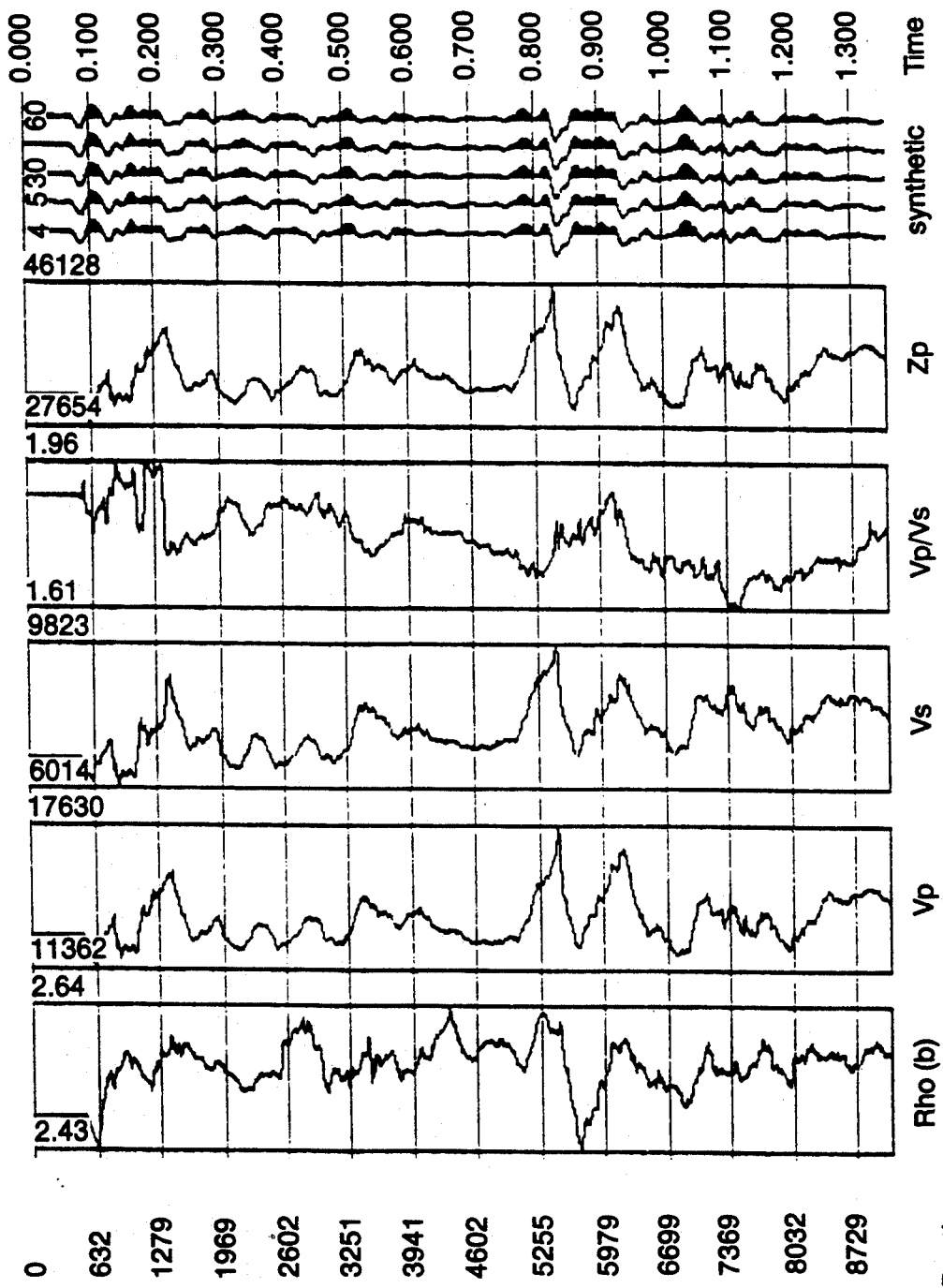

BAR CODE SYSTEM USED IN GEOPHYSICAL EXPLORATION

This is a continuation of copending application Ser. No. 264,917 filed Oct. 31, 1988 now abandoned.

BACKGROUND

The present invention relates generally to a method and system for geophysical exploration and more particularly to a method and system for obtaining selected physical properties from samples of the earth's subterranean formations surrounding a wellbore and for obtaining inverse logs of the selected physical properties along the length of the wellbore for evaluating the oil and gas bearing potential of the earth's subterranean formations.

In the continuing search for oil and gas, explorationists have developed a wide array of geophysical exploration methods for imaging the earth's subterranean formation structures and displaying those images as well as providing estimates of selected formation characteristics such as lithology, porosity, density, and velocity of propagation of seismic energy in the earth's formations. Exemplary of such geophysical exploration methods are seismic surveys, gravity surveys, and magnetic surveys. The principal geophysical method for oil and gas exploration within the earth's subterranean formation is seismic exploration. Simplistically, seismic exploration comprises imparting seismic energy into the earth and recording the earth's response thereto. The earth response can include both refracted and reflected seismic energy. As the seismic energy propagates through the earth, it is controlled by the physical properties of the rocks and the fluids contained therein. Unfortunately, explorationists cannot directly measure these physical properties which constrain the propagation of seismic energy from the recorded seismic survey data. Rather, seismic exploration techniques merely provide a measure of the time it takes the seismic energy to traverse some path. In fact, it is often times impossible to precisely ascertain the path taken by the seismic energy. In view of such uncertainties, how is it that explorationists are able to estimate formation lithology, fluid content or even simple, reconstruct formation geometries through which the seismic energy propagates with only a measure of time? Quite simply, the answer is explorationists cannot without the aid of additional information such as estimates of the velocities of propagation of seismic energy in rock and rock density as well as other rock and fluid physical properties. Methods for estimating the velocity of propagation and a density as a function of depth are generally known to those skilled in the art; however, velocity estimations are the weakest element in the inversion of seismic time data.

Often times, wells which have been drilled based on geophysical survey data are logged using one or more of the well logging techniques such as acoustic logging, resistivity logging, neutron logging, etc. Results of such well logging techniques can provide the explorationist with selected physical properties generally over regions of interest along the wellbore length. With such well logging techniques, explorationists are able to obtain better estimates of the formation physical properties for evaluating geophysical survey data. However, it must be recognized that such well logging techniques still only provide an indirect measure of the formation physical properties of interest and are generally limited to only selected regions of interest within a wellbore.

Occasionally, core samples are obtained from limited regions of interest within a wellbore for transport to a central laboratory so that physical properties of the formations adjacent the borehole, such as fluid content of the sample, (U.S. Pat. No. 2,458,093), oil content of the sample (U.S. Pat. No. 2,531,083), and electrical resistivity of the sample (U.S. Pat. No. 2,613,250) can be obtained. Unfortunately, such core samples generally represent only a small fraction of the formational lithologies traversed by the wellbore along its length. Moreover, the delay associated with transporting the samples to the central laboratory can preclude the measurement of properties of certain friable lithologies or result in seriously degraded measurements of certain properties. During the drilling process, chips which have broken away from the subsurface formations can be captured from the drilling fluid at the surface for analysis. Typically, explorationists have identified the lithologies of the subsurface formations from such chips. However, determining the exact depth in the wellbore from which the chips originated is generally not possible due to the very nature of their transport to the surface. Consequently, core samples and chip samples fail to provide either a regular sampling of borehole formation lithologies along the length of the wellbore or fail to accurately determine the depth of origin of such samples so that logs of formation characteristics, as a function of depth over generally the entire wellbore length, cannot be produced. Moreover, the very nature of the chip samples can often times preclude measuring certain formation characteristics (for example, measurement of rock velocity or compressive strength).

In spite of current geophysical exploration methods, explorationists are not provided with direct measures of the physical properties of the formations surrounding a wellbore along its length. Rather, attempts to evaluate and interpret geophysical survey data must generally depend on estimates of formation physical properties or on indirect measures of the formation physical properties from only limited regions of interest in the earth's subsurface. Consequently, explorationists are unable to accurately calibrate the vertical extent of their geophysical survey data with direct measures of the earth's physical properties so as to better evaluate the oil and gas bearing potential of the earth's subterranean formations.

In order to overcome the difficulties noted above, the present invention provides a novel method and system of obtaining selected physical properties from samples of the earth's subterranean formations surrounding a wellbore and developing inverse logs of the selected physical properties along the length of the wellbore. Explorationists can employ such inverse logs of the selected physical properties to perform basin analysis whereby the physical properties obtained at one or more wellbores can be used to calibrate geophysical survey data at each wellbore location and then extrapolate such physical properties to other locations in the basin with the geophysical survey data so as to evaluate the oil and gas bearing potential of the earth's subterranean formations.

SUMMARY OF THE INVENTION

The present invention relates generally to a method and system for geophysical exploration and more particularly to a method and system for obtaining selected physical properties from samples of the earth's subterranean formations surrounding a wellbore and for obtaining inverse logs of the selected physical properties along the length of the wellbore so as to aid the geophysicist in evaluating the oil and gas bearing potential of the earth's subterranean formations.

In one embodiment of the invention, discrete samples can be obtained at selected intervals along the length of a wellbore so as to be representative of the formation lithologies traversed by the wellbore along its length. The discrete samples can then be processed at the wellsite with a transportable laboratory so as to obtain measures of a plurality of selected physical properties of the subterranean formations representative of their in-situ condition. An inverse log of each physical property as a function of depth can be prepared with which explorationists can evaluate geophysical survey data for oil and gas potential. In more detail, measures of the subterranean formation's compressional wave velocity, shear wave velocity, grain density, saturated density, dry density, magnetic susceptibility, compressive strength, and static elastic moduli can be determined from which one can also calculate the formation's acoustic impedance and porosity.

Inverse logs of one or more of the physical properties can be used to perform basin analyses. When used for basin analysis, the physical properties of each inverse log can be used to calibrate geophysical survey data of the basin at one or more wellbore sites within the basin from which the inverse logs were obtained. Having thus calibrated the geophysical survey data, explorationists can then extrapolate the physical properties to other locations in the basin remote to the wellbore site with the geophysical survey data to evaluate the oil and gas potential of the earth's subterranean formations at such remote locations.

In another embodiment of the invention, a transportable laboratory is provided which is especially adapted for processing, at a wellsite, large numbers of discrete samples obtained along the length of a wellbore in a minimum amount of time so as to obtain measures of the formations physical properties which more properly reflect their in-situ condition. Timely measurement of the physical properties of certain friable lithologies (such as shales) is essential if physical properties are to be obtained at all. Additionally, the in-situ measures of certain physical properties can be seriously degraded by a delay in measurement e.g., seismic energy velocities of propagation in the rock, and porosity. Surprisingly, such properties have been found to vary over a wide range of values simply due to a delay in the time of their measurement.

The transportable laboratory comprises a plurality of highly automated measurement stations each connected to a central processing unit (CPU). By labeling each sample with a unique machine readable sample code and each measurement station with a unique machine readable station code, reader means can be provided for reading the sample code of each sample and the station code of a selected measurement station into the CPU. Upon receipt of valid sample and station codes, the CPU initiates the measurement of the sample at the selected measurement station and stores the measurements in a data file associated with the unique sample code. The CPU can also calculate additional physical properties from selected measured physical properties. Thus, the transportable laboratory becomes in effect a "paperless" laboratory since manual recordation of a sample's identity and its measured and calculated physical properties has been eliminated. The paperless laboratory greatly reduces errors generally associated with manually recording such information. In addition to initiating such measurements and recordation, the CPU can initiate a prescribed sequence of measurements at a given measurement station as well as collect, collate and evaluate the physical properties measured to provide inverse well logs of the measured properties as a function of depth. Additionally, the CPU can calculate additional physical properties from the physical properties measured as well as reinterpret geophysical survey data and models at a remote site.

The present invention will be better understood with reference to the following drawings and detailed description.

BRIEF DESCRIPTION OF THE DRAWINGS

FIGS. 3 (a, b, c) depict inverse logs of velocity measured from samples obtained at selected intervals along three separate wellbores;

FIGS. 4 (a, b, c) depict inverse logs of porosity measured from samples obtained at selected intervals along three separate wellbores;

FIGS. 5 (a, b, c, d, e, f) depict inverse logs of formation properties density, compressional velocity ($V_p$), shear velocity ($V_s$), $V_p/V_s$ ratio, impedance and magnetic susceptibility from samples obtained at generally ten foot intervals along the length of the wellbore; and FIGS. 6 (a, b, c, d, e) depict smoothed inverse logs of density, compressional velocity ($v_p$), shear velocity ($v_s$), the ratio $v_p/v_s$, and formation impedance, respectively, while FIG. 6 (f) represents synthetic seismic traces obtained by convolving a source wavelet with the inverse log of formation impedance shown in FIG. 5 (e);

FIGS. 7 (a, b) show a section of a seismic survey in FIG. 7a, and FIG. 7b depicts an inverse log of formation impedance obtained from samples collected along the length of the wellbore indicated by the derrick structure in FIG. 7a.

DETAILED DESCRIPTION OF THE INVENTION

Figure 1:
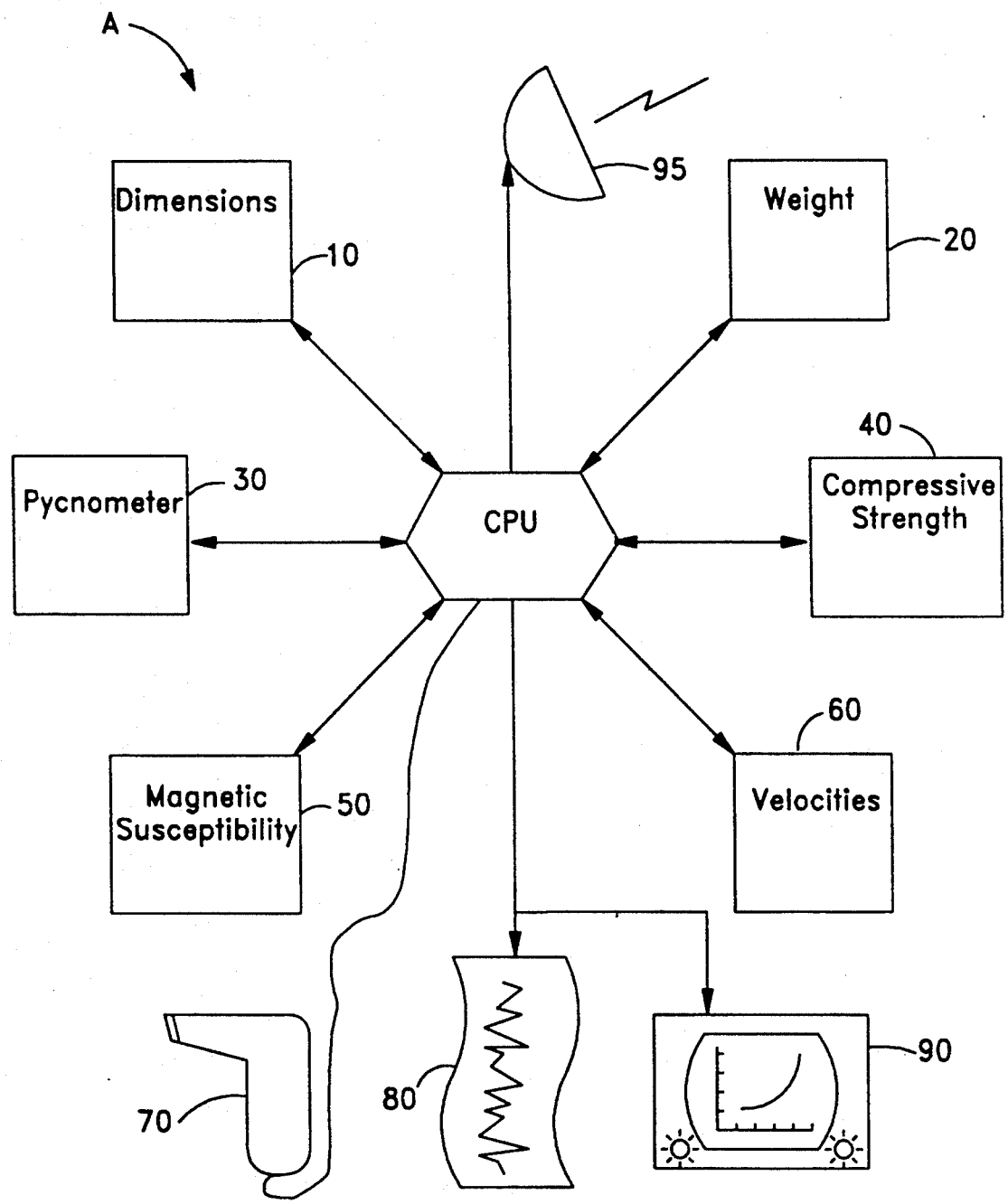
FIG. 1 is a schematic representation of a transportable laboratory according to the present invention.

The present invention provides a novel method and system for geophysical exploration.

The following discussion is provided in order to more completely understand the present invention. In the continuing search for oil and gas, explorationists employ a variety of geophysical and geological survey techniques to identify regions having potential oil and gas formations. By their very nature, such geophysical and geological survey techniques generally provide only indirect estimates of selected subsurface formation properties which the explorationist uses to interpret potential oil and gas formations. Moreover, such survey techniques generally depend on at least estimates of selected physical properties of the earth's subterranean formations before any meaningful interpretation can be made of either the formations' structure or their oil and gas bearing potential.

By way of example, explorationists often times employ the time it takes seismic energy to travel from the earth's surface to a reflecting horizon and back again to infer structure, lithology, porosity fluid content as well as the path traversed by the seismic energy. Similarly, magnetic surveys can provide estimates of formation structure. However, geophysical and geological survey techniques do not generally directly measure the properties of interest, but rather simply provide indirect measures of other characteristics of the formation from which it is possible for the explorationist to estimate the physical properties of interest.

After a wellbore is drilled, well logging techniques (such as sonic logging, electric resistivity logging, gamma ray logging, gravity logging, neutron logging, etc.) can provide additional estimates of the subsurface formation properties of interest. However, additional sources of error (such as borehole rugosity, mudcaking, varying borehole dimensions, variation of and borehole fluids) can be introduced by such logging techniques which may adversely affect the quality of the estimates of the formation physical properties. On occasion, wellbores have been cored to provide a few samples of selected formations over limited intervals adjacent the wellbore from which direct measures can be obtained. Generally, such samples are obtained at a wellsite and then transported to a central facility for measurement some time thereafter. However, Applicants have found that certain formation properties (such as velocity and porosity) can be substantially altered if they are not measured shortly after removal from the wellbore, while the physical properties for certain friable lithologies are simply not obtainable at all if not done within a few hours after their removal from the wellbore. Moreover, even for those formation physical properties not affected by time, the physical properties measured are generally measured on only a handful or so of samples over a very short interval of the wellbore. Consequently, the explorationist is simply not provided with direct measures of formation physical properties for substantially the entire length of the wellbore. Hence, the value of such information is limited to regions adjacent the borehole from which the samples came and the explorationist is left to evaluate and interpret the balance of his geophysical survey data with only estimates of the subterranean formation physical properties.

In one embodiment of the invention, core samples can be obtained over substantially the entire length of a wellbore; however, an important aspect of the present invention is that discrete samples of the earth's formations surrounding a wellbore need only be taken at selected intervals along the length of the wellbore. One criteria for establishing the sampling intervals is that discrete samples generally be obtained for every formation lithology traversed by the wellbore along its length. Since the physical properties of the formations surrounding the wellbore can also be used to evaluate and calibrate geophysical survey data (e.g., seismic survey data), the minimum resolution interval of the geophysical survey data being evaluated establishes another criteria for the sampling interval. Typically seismic data has the finest resolution interval of any geophysical survey technique (approximately 100 ft). In practice, we have found that a sampling interval of one sample every 10 ft adequately addresses the criteria of lithology changes as well as the geophysical survey minimum resolution interval criteria so as to address the problems of heterogeneous rather than homogeneous earth formations so that the physical properties of the samples can be correlated with geophysical survey data without introducing sampling bias.

In another embodiment of the invention, a transportable laboratory is provided so as to process samples obtained from the earth's formations surrounding a wellbore along its length. Since timely measurement of certain physical properties and of certain lithologies can be important, the transportable laboratory is preferably configured for field operation in the vicinity of the wellbore. Generally, the transportable laboratory comprises a plurality of measurement stations, each adapted to measure at least one physical property of each sample. Additionally, the transportable laboratory includes a central processing unit for identifying samples, initiating measurements on the samples at selected measurement stations, and storing the measured physical properties in a sample data file.

Prior to discussing the operation of each measurement station of the transportable laboratory A, the basic sequence of steps for all operations will be discussed with reference to both FIGS. 1 and 2. Every sample which enters the transportable laboratory A is given a unique machine readable sample code (which includes a well identifier, date and depth). Preferably, such sample codes are included on a label adapted to be mounted on each sample. Every measurement station is assigned a unique machine readable station code. Preferably, the sample codes and station codes are bar codes which can be read by a laser bar code reader into a central processing unit (CPU). As such, the transportable laboratory A is capable of processing a large number of samples through each of the various measurement stations employing multiple, asynchronous flow paths, until each sample has been through each measurement station. To initiate a measurement sequence at any measurement station, the machine readable station code (preferably a bar code) assigned to a selected measurement station is read into the CPU using a laser bar code reader 70 at step 100. The sample to be measured at the selected measurement station then has its unique machine readable sample code (preferably a bar code) read into the CPU with the laser bar code reader 70 at step 110. If the station code and the sample code are both valid codes, the CPU directs the selected measurement station at Step 120 to initiate a sequence of measurements unique to the selected measurement station and the set of measurements obtained are then stored in the CPU at step 130 in a sample data file associated with the sample s unique sample code.

I. SYSTEM

Figure 2:
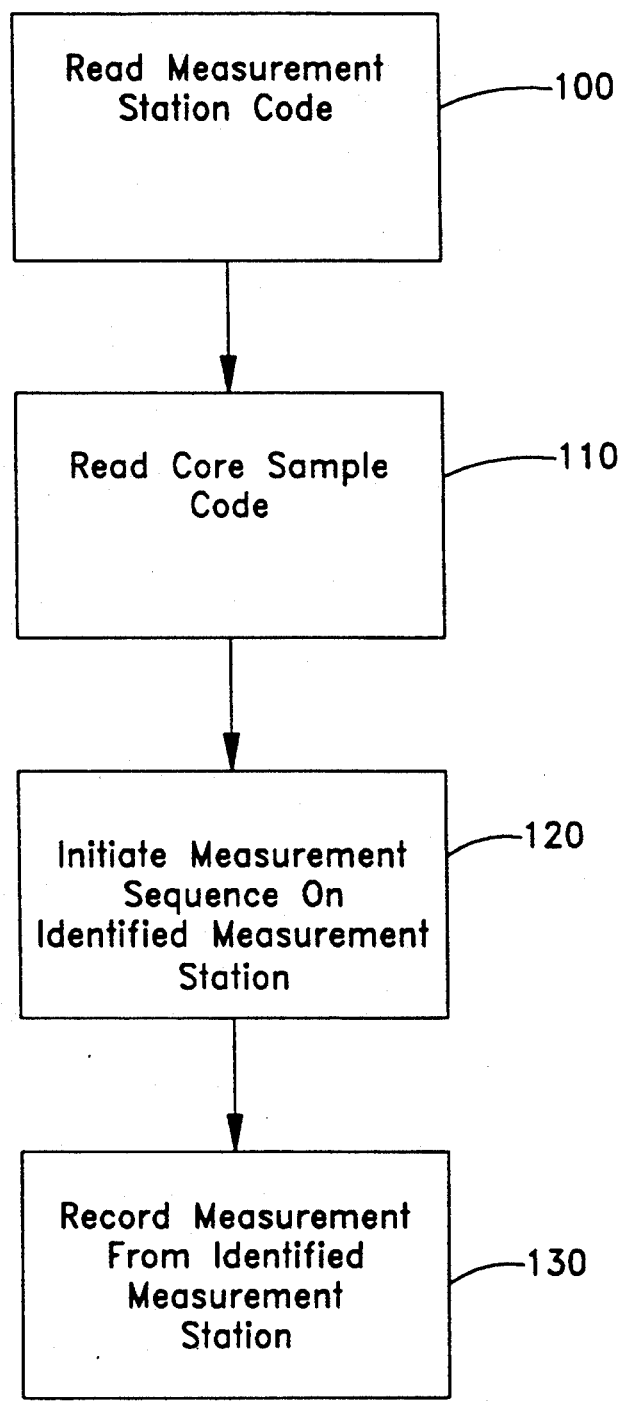
FIG. 2 is a generalized flow diagram for the operation of each measurement station in the transportable laboratory.

Looking now to FIG. 1, a schematic representation of the transportable laboratory A is shown. Although the transportable laboratory A is particularly suited to field needs, those skilled in the art will appreciate that the transportable laboratory satisfies many of the needs of a central stationary laboratory. Generally, the transportable laboratory A comprises a plurality of uniquely identified measurement stations connected to a central processing unit (CPU) such as a Hewlett-Packard 9000 series 500 computer and a laser bar code reader 70 as manufactured by Intermec. The CPU also includes a mass storage system (not shown) for collecting and storing the physical properties obtained from the various samples which are processed by the transportable laboratory A.

In particular, the transportable laboratory A includes an electronic dimension jig 10 for digitally measuring sample lengths and diameters. The dimensioning jig 10 includes pairs of opposed linear voltage displacement transducers (LVDT) adapted to measure axial and lateral dimensions of each sample. The transportable laboratory A also includes an electronic balance 20 adapted to measure the weight of each sample. Further, an electronically driven pycnometer 30 is provided to measure grain density of each sample; a triaxial loading apparatus 40 is provided to obtain measures of each sample's compressive strength, as well as provide an input for calculating Young's modulus and Poisson's ratio for each sample; an electronic magnetic susceptibility meter 50 is provided to obtain a measure of the magnetic susceptibility for a given weight of sample; and a pair of electronically driven pressure velocity cells 60 are provided to measure the velocities of propagation of compressional (P), horizontal shear (SH), and vertical shear (SV) waves in each sample as a function of pressure. A laser bar code reader 70 is provided to read both the unique sample codes assigned to each sample and the unique station codes assigned to each measurement station into the CPU such that the CPU can initiate a measuring sequence on a sample at a selected measurement station and store the results of such measurement in a sample data file within the CPU memory. The CPU accumulates all the measurements from the various measurement stations for a particular sample in the sample data file. The individual sample data files can be displayed at a printer or plotter 80 or a CRT screen 90, or be transmitted via satellite to a central location with a satellite communication station 95. Additionally, each physical property from the samples can be sequenced according to depth to produce inverse logs of selected physical properties representing the formations surrounding the wellbore along its length or used form cross plots of selected physical properties for trend analysis.

The transportable laboratory A of the present invention provides means for obtaining measurements of the following physical properties from discrete samples taken at selected intervals along the length of a wellbore: grain density, dry bulk density, saturated bulk density, magnetic susceptibility, compressive strength, elastic moduli, and seismic velocities (P, SH, SV) versus pressure. With these direct measurements one can calculate many other physical properties of interest. For example, the difference between the grain density and the dry bulk density yields a porosity estimate; likewise, the difference between the saturated and dry bulk densities yields another estimate of porosity. Further, combinations of saturated density and seismic velocities yield dynamic elastic moduli, acoustic impedance and reflection coefficients. Piecewise integration of the seismic velocity over the depth interval sampled can yield an estimate of the two-way traveltime, which can be used to calibrate the time observed on a seismic section to a true depth. Additionally, synthetic seismic traces can be produced by convolving an inverse log of formation impedance with a wavelet having known characteristics for the calibration of seismic survey data. A more complete discussion below will detail uses of the measured physical properties and the inverse logs derived therefrom.

II. OPERATION

Each discrete sample obtained at selected intervals along the length of a wellbore is assigned a unique machine readable sample code, preferably a bar code, which can be mounted with the sample or attached with its sample holder. All measurement sequences begin by entering the measurement station code and sample code via the bar code reader 70 into the CPU. Hereafter, the step of reading the station code and sample code will be understood in the operation of each measurement station. In order to carry out the desired measurements at the various measurement stations shown in FIG. 1, three separate samples are cut from each discrete sample. The three samples obtained from each discrete sample are each generally right circular cylinders having lengths of approximately 0.5", 1.5" and 2.75". With reference to FIGS. 1 and 2, generally the detailed steps to obtain at least one physical property of each sample at each measurement station will be discussed. In order to simplify the following discussion, the operation of the transportable laboratory A will be made with respect to the operations which occur on each separately sized sample (i.e., 0.5", 1.5" and 2.75").

The 0.5" sample will be referred to hereafter as the disc sample. The initial measurements made on each disc sample are its length and diameter at 10 and its saturated weight at 20. The disc sample is dried and then placed in a vacuum oven for an additional period. The dried disc samples are then weighed again at 20 to obtain their dry weight. The dry weight can be used by the CPU in calculating the dry bulk density of each sample. About 20 gms of the disc sample are subsequently crushed to a particulate size of 0.25" or less. A portion of the fragmented disc sample is then placed in a pycnometer cup and reheated in a vacuum oven. The pycnometer 30 is used to obtain a measure of the disc sample's grain density. The pycnometer 30 measures a volume of space occupied by the fragmented sample and pycnometer cup using helium gas. Because the measurements by the pycnometer 30 takes the longest time of any measurement station, the system includes multiple pycnometers 30 which are each interfaced to an IBM AT computer (IBM) (not shown) so as to permit automated operation of each pycnometer which in turn is connected with the CPU.

After receiving a valid sample code and pycnometer station code, the CPU signals the selected pycnometer to begin its measurements. The fragmented disc sample is inserted into the pycnometer's sample chamber. Upon completion of the measurement cycle, the IBM reads a measured volume and divides by the recorded sample weight to arrive at a grain density for the fragmented disc sample. This value along with the sample code and pycnometer station code are sent back to the CPU for storage and further processing.

The fragmented disc sample can also be used for magnetic susceptibility measurement at 50. Here the fragmented disc sample is poured into a polyethylene vial of known weight and reweighed at 20 and its specific magnetic susceptibility is measured using a Bartington magnetic susceptibility meter at 50. When the magnetic susceptibility measurement has been completed, an average of five readings can be sent to the CPU memory.

The 1.5" sample can be used to measure the seismic velocities of the discrete samples at pressures appropriate for their in situ depth. The magnitude of seismic velocity in rock is sensitive the concentrations of cracks and pores. Since cracks exhibit a strong pressure dependence, seismic rock velocities can exhibit a strong pressure dependence. Therefore, to make meaningful velocity measurements on rock, one must subject it to the pressure and saturation it experiences in situ. This is done most effectively by making velocity measurements on the 1.5" samples at a plurality of pressures which bracket the in-situ pressure appropriate for each discrete sample.

The flat faces of the 1.5" samples are first polished to remove cutting marks and to make the faces more parallel for dimension measurements at 10 and velocity measurements at 60. A bar code label can be affixed to the perimeter of the 1.5" sample with mylar tape. One side of the 1.5" sample is marked to indicate a preferred bedding direction for alignment with respect to the shear wave polarizations. The 1.5" samples are kept in a water bath while awaiting velocity measurement so as to maintain their fluid saturation. The 1.5" samples are typically processed in batches since each pressure velocity cell 60 has positions for multiple samples.

The 1.5" sample processing begins by measuring its dimensions at measuring station 10. The 1.5" sample weight can then be obtained at measurement station 20. Having the 1.5" sample dimensions and weight, one is ready to measure the velocities of the compressional (P) and shear (S) waves in the 1.5" samples as a function of pressure using a pulse transmission technique.

Each 1.5" sample is inserted between a set of end caps. The relative orientation of each 1.5" sample with the end cap provides a mechanism for determining the relative anisotropic orientation of the sample. Piezoelectric transducers assemblies are mounted within both end caps. The 1.5" sample and end cap assembly are then installed in the pressure velocity cell 60 and electrical connectors are attached. These connectors permit the transmitted and detected signals to be applied and received from the appropriate transducers. The operator selects a pressure velocity cell by reading the appropriate station code and sample code via the bar code readers. Once the CPU decides there is a valid sample code, a control program begins filling and pressurizing the pressure velocity cell 60. An acquisition program is activated by the CPU when equilibrium at programmed pressure set points is achieved. Five time series are collected for each sample at each pressure point. When the measurements at the pressure velocity cell 60 are complete, the samples are removed and reweighed at 20. The new weight is the saturated weight. Saturated weight plus sample volume obtained from sample dimensions yields a saturated density.

With the measurement of the compressional (P) and shear (S) wave velocities of each 1.5" sample, the CPU can calculate a measure of the 1.5" samples anisotropy, the magnitude of the difference between the fast and slow shear velocities, and saturated density. When these measurements are coupled with disc sample measurements, one can estimate sample porosity i.e., difference between saturated and dry density provide a saturated porosity estimate.

The remaining 2.75" sample (hereafter plug) is plugged parallel to its long axis with a 1" diameter hollow core bit. The ends are trimmed parallel and flat with a slow speed precision cutoff saw. The plug sample is used in the triaxial loading apparatus 40 to determine its compressive strength, Young's modulus, and Poisson's ratio. The plug sample length and diameter are measured at 10. A radial LVDT is positioned at the midpoint of the plug sample and an axial LVDT is mounted on one end of the plug sample and extension rod on the other. The plug sample can then be inserted into the triaxial loading apparatus 40. The CPU first sets a confining pressure within the triaxial loading apparatus 40 to a value appropriate for the sample's depth within the wellbore and then raises the pore pressure to a fixed value to assure sample saturation. The CPU then initiates axial loading of the plug sample at a programmed rate, nominally 10-6 sec-1, until failure of the plug sample. Axial and radial displacements from the LVTS's are constantly recorded by the CPU during loading. These values can be normalized by the original dimensions to provide axial and radial strains. The CPU can also determine the slope of the axial strain versus axial stress to yield a value for Young's modulus. The incremental ratio of radial to axial strain can provide values of Poisson's ratio. The maximum stress (force/sample area) reached during the test is the compressive strength of the plug sample.

Separate operating programs allow the CPU to process a plurality of samples through multiple, asynchronous flow paths until each sample has gone through each of the various measurement stations. These programs run in there own virtual machines within the CPU.

The most complicated program is MAIN. This program directly interfaces to the bar code readers 70, magnetic susceptibility meter 50, balance 20, pycnometer, digital dimension jig 10 and memory storage devices (not shown) and indirectly with the pressure velocity cell 60 and the triaxial loading apparatus 40. All bookkeeping and sample data file entries are done through the program MAIN. When a sample code is recognized by the CPU, it is assigned an external sequence number which consists of year, Julian day and daily run number. An active discrete sample code list is maintained by MAIN. The sample code list includes filenames and mass storage locations, The filenames correspond to the measurement results from selected measurement stations. When a sample code is ventered by the laser code reader 70, MAIN first checks the active sample code list; if the sample code exists, it will proceed to the proper measurement subroutines. If the sample code is not found on the active sample code list, a set of data files are created and the sample code is added to the active sample code list and measurements can then be carried out. Whenever the active sample code list is updated or a new measurement is performed, the sample codes and status can be display on the CRT 90.

There are a few measurements which are more involved than weighing or measuring sample dimensions such as velocity and compressive measurements. For such measurements, additional programs which vary extrinsic variables and programs to measure intrinsic properties of the samples as a function of the variation in extrinsic variables are provided.

III. FORMATION EVALUATION

With the direct measures of a plurality of selected physical properties of the formation surrounding one or more wellbores along their length, explorationists are now in a position for the first time to more intelligently use geophysical survey data to evaluate the oil and gas bearing potential of the earth's subterranean formation both during the well drilling process at the wellsite as well as after completion of the well at a remote facility. Looking first to FIGS. 3, 4, 5, and 6, inverse logs of measured and calculated physical properties obtained from samples of the earth's formations at selected intervals along the length of a wellbore are shown. In particular, FIGS. 3 (a, b and c) each represent inverse logs of the compressional wave velocity ($V_p$) in samples obtained at selected intervals along the length of three separate wells. The velocities depicted in FIG. 3 represent the velocity in a particular sample unlike previous velocity estimates which are really no more than an averaged or integrated velocity. The importance of such distinction is that acoustic impedance changes in the earth which provide an indication of the nature of the reflection and refraction of seismic energy depend not on averaged or integrated velocities; but rather, on the interval velocity of seismic propagation in each formation lithology.

FIGS. 4 (a, b, and c) depict inverse logs of formation porosity measured from samples obtained at selected intervals along the length of three separate wellbores. Additionally, FIGS. 5 (a, b, c, d, e and f) depict inverse logs of formation density, compressional wave velocity $(V_p)$, shear wave velocity $(V_s)$, the ratio $V_p/V_s$, formation impedance and magnetic susceptibility, respectively. The sample interval for the inverse logs of FIG. 5 is much finer than the minimum resolution thickness of conventional geophysical survey data. Consequently, such oversampling tends to produce inverse logs which have a very "spiky" appearance as depicted in FIG. 5. However, when the inverse logs of FIG. 5 are smoothed with a smoothing operator having a wave length generally equal to the minimum resolution thickness of the geophysical survey data with which it is to be compared, the inverse logs take on an appearance similar to those in FIGS. 6 (a-e). IN fact, the inverse logs of FIG. 6 (a-e) were smoothed with a smoothing operator having a minimum resolution thickness appropriate for seismic survey data. The synthetic traces of FIG. 6 (f) were produced by convolving a wavelet signal having characteristics of a seismic source with the smoothed inverse impedance log of FIG. 5 (e) and correspond well with actual seismic survey data.

The importance of having such inverse logs of formation properties along the length of a well both during the drilling process and upon completion of the drilling process can be very important. By way of example with the inverse logs of formation velocity to the point of current drilling within the wellbore, the original geophysical survey data can be reprocessed to forecast depth to target. Additionally, inverse logs of formation compressive strength obtained during the drilling process can provide the drillers with information important for controlling drilling parameters.

Figures 7A, 7B:
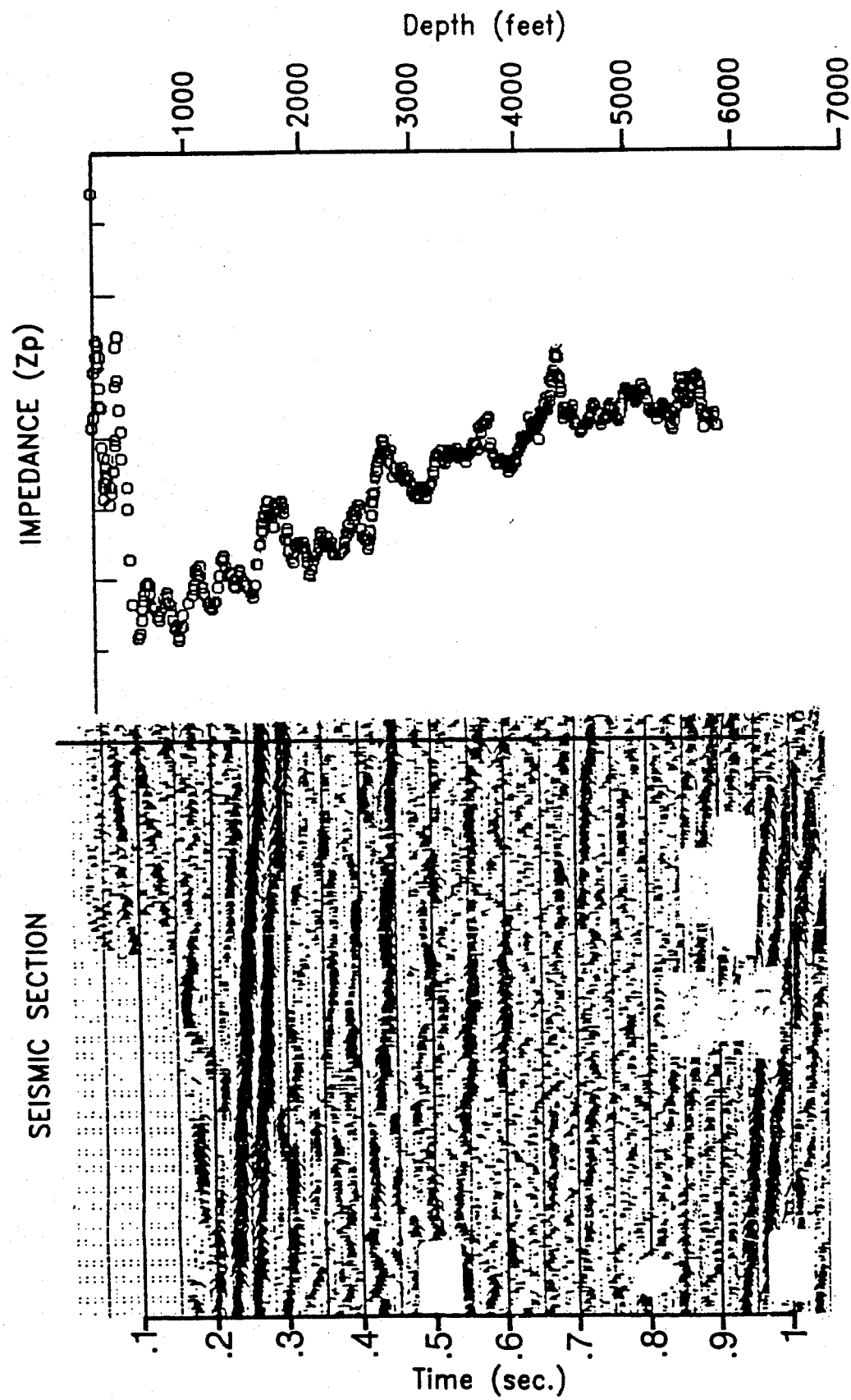

With inverse logs of formation physical properties obtained at selected intervals along the wellbore, the geophysical survey data can be calibrated to the physical properties represented in the inverse log. In particular, FIGS. 7a and 7b represent a seismic time section and an inverse log of formation impedance measured from samples obtained at selected intervals along the length of a wellbore. In particular, the inverse impedance log of FIG. 7b was obtained at a well site indicated by the derrick structure in FIG. 7a. With such comparison of the inverse log of impedance and the seismic section one can calibrate the physical properties of the formation at the location of the wellbore site. Having calibrated the geophysical survey data (in this case the seismic survey data) at the wellbore site, geophysicists can then use the calibrated geophysical survey data to extrapolate the physical properties to remote locations in a basin.

Thus, the present invention provides a novel method and system of obtaining selected physical properties from samples of the earth s subterranean formations surrounding a wellbore and developing inverse logs of the selected physical properties along the length of the wellbore. Explorationists can employ such inverse logs of the selected physical properties to perform basin analysis whereby the physical properties obtained at one or more wellbores can be used to calibrate geophysical survey data at each wellbore location and then extrapolate such physical properties to other locations in the basin with the geophysical survey data so as to evaluate the oil- and gas-bearing potential of the earth's subterranean formations.

It should thus be understood that the invention is not limited to any specific embodiment set forth herein as variations are readily apparent and thus the invention is to be given the broadest possible interpretation within the terms of the following claims.

We claim:

1. A geophysical system for processing a plurality of samples of the earth's subterranean formations so as to obtain a plurality of physical properties for each sample representative of their in-situ condition, comprising:
   (a) a unique machine readable sample code label with each sample;
   (b) a plurality of separately arranged measurement stations for measuring a plurality of selected physical properties, wherein each measurement station measures at least one physical property for each sample and each measurement station includes a unique machine readable station code;
   (c) reader means for machine reading the sample codes and station codes when a sample is at a selected measurement station; and
   (d) central processing mans interconnected to each measurement station and said reader means for initiating the measurement of at least one physical property of a sample at a selected measurement station upon receiving the station code and the sample code from the reader means as well as for storing the measurements of the sample and for non-sequentially processing each sample through the plurality of separately arranged measurement stations.

2. The geophysical system of claim 1, further including:
   display means for displaying well logs of selected physical properties as a function of depth in a wellbore.

3. The geophysical system of claim 1, further including:
   means for transmitting the measures of physical properties to a remote location.

4. The geophysical system of claim 1, wherein the measurement stations include means for measuring formation density, compressional wave velocity, shear wave velocity, compressive strength, porosity and magnetic susceptibility.

5. The system of claim 1, further including means for combining at least two measured physical properties for a sample and obtaining a third physical property of the sample.

6. The system of claim 1, wherein each sample is subdivided into at least two separate samples having corresponding sample codes identifying the origin of the original sample.

7. A method for processing a plurality of samples of the earth's subterranean formations at a plurality of separately arranged measurement stations so as to obtain a plurality of physical properties for each sample, comprising the steps of:

(e) labeling each sample with a unique machine readable sample code;

(b) assigning each measurement station a unique machine readable station code;

(c) machine reading the sample code and station code when a sample is at a selected measurement station into a central processing unit; and (d) having the central processing unit responsive to receipt of the sample code and the station code initiating a measurement of at least one physical property of the sample at the selected measurement station, storing the measurement of the physical property and non-sequentially processing the sample through the separately arranged measurement station.

8. The method of claim 7, further including subdividing each sample into at least two separate samples and labeling such separate samples with corresponding sample codes identifying the origin of the original sample.

9. The method of claim 7, further including the steps of combining at least two measured physical properties for a sample and obtaining a third physical property of the sample.

* * * * *

UNITED STATES PATENT AND TRADEMARK OFFICE
CERTIFICATE OF CORRECTION

PATENT NO.   : 5,134,271
DATED        : July 28, 1992
INVENTOR(S)  : Sondergeld, et al It is certified that error appears in the above-indentified patent and that said Letters Patent is hereby corrected as shown below:

| Col. | Line | |
|------|------|---|
| 10 | 35 | "is ventered" should read --is entered--. |
| 11 | 17 | "$\mathrm{O}V_p$)" should read --$(V_p)$--. |
| 11 | 68 | "the earth s" should read --the earth's-- |
| 12 | 34 | "processing mans" should read --processing means-- |
| 13 | 3 | "(e) labeling" should read --(a) labeling--. |
| 14 | 3-4 | "measurement station" should read --measurement stations--. |

Signed and Sealed this

Sixteenth Day of November, 1993

Attest:

BRUCE LEHMAN

*Attesting Officer*    Commissioner of Patents and Trademarks